(12) United States Patent
Burek et al.

(10) Patent No.: US 11,061,195 B2
(45) Date of Patent: Jul. 13, 2021

(54) FIRE SAFETY RETAINERS FOR POINT OF ENTRY AND OTHER MODULES STORING OPTICAL FIBERS OR CABLES

(71) Applicant: OFS Fitel, LLC, Norcross, GA (US)

(72) Inventors: Denis E Burek, Cumming, GA (US); Eric J Leichter, Buford, GA (US)

(*) Notice: Subject to any disclaimer, the term of this patent is extended or adjusted under 35 U.S.C. 154(b) by 0 days.

(21) Appl. No.: 16/219,247

(22) Filed: Dec. 13, 2018

(65) Prior Publication Data

US 2020/0096717 A1 Mar. 26, 2020

Related U.S. Application Data

(60) Provisional application No. 62/734,933, filed on Sep. 21, 2018.

(51) Int. Cl.
*G02B 6/44* (2006.01)
*F16M 13/02* (2006.01)

(52) U.S. Cl.
CPC ............. *G02B 6/444* (2013.01); *F16M 13/02* (2013.01)

(58) Field of Classification Search
CPC .......... F16L 3/137; F16L 3/233; G02B 6/444; F16M 13/02
USPC ....... 248/544, 546, 547, 689, 49, 50, 60, 62, 248/71, 72, 74.1, 74.2, 74.5, 300, 684, 248/216.1, 217.2, 217.3, 217.4; 206/389, 206/408–409
See application file for complete search history.

(56) References Cited

U.S. PATENT DOCUMENTS

| | | | | |
|---|---|---|---|---|
| 1,462,671 A * | 7/1923 | Johnvrba | ............... | F16L 3/1233 248/71 |
| 1,772,687 A * | 8/1930 | Reinke | ....................... | F16L 3/04 24/129 R |
| 2,163,016 A * | 6/1939 | Barker | ................... | A01K 35/00 40/304 |
| 2,312,393 A * | 3/1943 | Donnelly | ................ | F21V 17/00 362/355 |
| 2,880,949 A * | 4/1959 | Fuss | ........................ | F16L 3/227 248/70 |
| 3,362,737 A * | 1/1968 | Cobb | ........................ | F16B 5/02 403/373 |
| 3,476,343 A * | 11/1969 | Burrell | ................... | H02G 3/123 248/216.4 |
| 3,887,967 A * | 6/1975 | Vandenbossche | ........ | F16B 2/08 24/16 R |

(Continued)

*Primary Examiner* — Christopher Garft
*Assistant Examiner* — Michael McDuffie
(74) *Attorney, Agent, or Firm* — Law Office of Leo Zucker, Esq.

(57) ABSTRACT

A safety retention clip for installation in a module that stores a length of a communication line. The clip has a body formed of metallic sheet material. The body has a base portion, and a retaining finger portion joined to the base portion. A distal end of the finger portion is configured to overlie a communication line stored inside the module, and to retain the line close to a building wall on which the module is mounted if the module melts during a building fire. A mounting hole is formed in the base portion of the clip body, near a proximal end of the finger portion for insertion of a mounting screw. The hole extends through a boss that projects downward from the base portion, and the boss is sized to nest in a corresponding mounting opening in a base of the module in which the clip is installed.

12 Claims, 2 Drawing Sheets

(56) References Cited

U.S. PATENT DOCUMENTS

| | | | | |
|---|---|---|---|---|
| 4,370,082 | A * | 1/1983 | Sundberg | F16L 3/04 248/71 |
| 4,673,151 | A * | 6/1987 | Pelz | F16L 3/1215 24/336 |
| 4,856,739 | A * | 8/1989 | Takikawa | F16L 3/085 248/74.2 |
| 4,865,279 | A * | 9/1989 | Kosugi | F16L 3/1233 248/68.1 |
| 5,234,301 | A * | 8/1993 | Grossberndt | B21J 5/066 411/386 |
| 5,405,111 | A * | 4/1995 | Medlin, Jr. | H02G 3/125 248/205.1 |
| 5,669,589 | A * | 9/1997 | Janssen | H02G 3/26 248/65 |
| 5,897,082 | A * | 4/1999 | Losada | F16L 3/04 248/65 |
| 6,079,765 | A * | 6/2000 | Zaguskin | B60R 16/02 248/68.1 |
| 6,489,569 | B1 * | 12/2002 | Thomson | H01B 17/145 174/154 |
| 6,672,547 | B1 * | 1/2004 | Westerberg | F16L 3/24 248/316.1 |
| 7,559,512 | B1 * | 7/2009 | diGirolamo | F16L 3/1233 24/23 R |
| 7,789,359 | B2 * | 9/2010 | Chopp, Jr. | H02G 3/263 182/129 |
| 7,793,892 | B1 * | 9/2010 | Bowen | A61M 39/08 128/DIG. 26 |
| 8,123,178 | B2 * | 2/2012 | Yoshida | B60R 16/0215 174/72 A |
| 8,128,048 | B2 * | 3/2012 | Odishoo | A47K 10/185 248/316.7 |
| 8,714,496 | B2 * | 5/2014 | Blanchard | H02G 3/32 248/62 |
| 9,004,414 | B2 * | 4/2015 | Durben | A47G 25/08 24/303 |
| 9,429,729 | B2 * | 8/2016 | Burek | G02B 6/4457 |
| 2004/0206856 | A1 * | 10/2004 | Cordero | F16L 3/1233 248/70 |
| 2008/0011909 | A1 * | 1/2008 | Daddario | A47G 19/2222 248/65 |
| 2010/0260573 | A1 * | 10/2010 | Gardner | F16L 3/04 411/81 |
| 2011/0031356 | A1 * | 2/2011 | Vonada | A01G 17/04 248/71 |
| 2011/0215220 | A1 * | 9/2011 | Loebig | B60K 13/04 248/674 |
| 2012/0138753 | A1 * | 6/2012 | Kim | B60R 16/0215 248/68.1 |
| 2015/0048220 | A1 * | 2/2015 | Patterson | H02G 3/32 248/68.1 |
| 2015/0165985 | A1 * | 6/2015 | Morris | B60R 16/0215 248/65 |
| 2015/0377070 | A1 * | 12/2015 | Robertson, Jr. | F02C 7/32 415/182.1 |
| 2018/0031788 | A1 * | 2/2018 | Duran | G02B 6/4251 |
| 2020/0218026 | A1 * | 7/2020 | Vaughn | G02B 6/4441 |

\* cited by examiner

FIRE SAFETY RETAINERS FOR POINT OF ENTRY AND OTHER MODULES STORING OPTICAL FIBERS OR CABLES

CROSS REFERENCE TO RELATED APPLICATION

This application claims priority under 35 U.S.C. § 119(e) of U.S. Provisional Patent Application No. 62/734,933 filed Sep. 21, 2018, and titled Point of Entry Module Fire Retention Clip, the entire contents of which are incorporated by reference.

BACKGROUND OF THE INVENTION

Field of the Invention

The present invention relates to wall-mounted modules that store optical fibers, cables, or other lines for distributing communication services to occupants of a multiple dwelling unit (MDU) building.

Discussion of the Known Art

Fire safety issues have arisen concerning installations of wires, cables, optical fibers, and other communication lines through hallways and evacuation routes in MDU buildings, wherein the lines are retained in place only by non-metallic fasteners or other means that are likely to fail during a fire. Firefighter injuries and deaths have occurred when the lines are not safely retained and are allowed to hang loose and interfere with the movement of responders inside a burning building. Moreover, loose hanging lines have become entangled with firefighter uniforms and breathing apparatus, making it impossible for them to escape before exhausting their air supplies. Investigators concluded that if the lines are not safely retained during the course of a building fire, responders will always be placed at risk.

Point of entry (POE) modules for storing slack coils or windings of optical fibers are often mounted on hallway walls inside MDU buildings, above or near the entry doors of living units along a given hallway. In order to provide network service to occupants of the units, designated fibers inside the POE modules are connected to corresponding drop fibers that are routed inside the units. See, e.g., U.S. Pat. No. 9,632,267 (Apr. 25, 2017), all relevant portions of which are incorporated by reference.

POE modules are typically molded of a plastics (e.g., a polypropylene copolymer) that meets local fire safety regulations with respect to smoke and flammability, but which softens or melts at high temperatures like those attained during a building fire. Network service providers are therefore concerned that a sustained fire could cause the modules to disintegrate to such an extent that any lengths of fiber initially stored inside the modules, will become free to hang loosely in the path of responders as they traverse a building hallway and enter living units along the hallway.

Accordingly, there is a need for a retainer device for use with POE and other modules that store slack lengths of fibers, cables, or other communication lines, so that the lines are retained safely in place and out of the path of responders should the modules melt or otherwise fail during a building fire.

SUMMARY OF THE INVENTION

According to the invention, a safety retention clip for installation in a module that stores a length of a communication line, includes an elongated clip body formed of a metallic sheet material, and having a base portion and a retaining finger portion a proximal end of which is joined to the base portion. A distal end of the finger portion of the clip body is configured to overlie a communication line stored inside the module in which the clip is installed, and to hold the line in place close to a wall or other building surface on which the module is mounted in the event the module melts or otherwise fails.

The base portion of the clip body has a mounting hole formed near the proximal end of the finger portion, for passage of a mounting screw. The mounting hole is formed through a boss that projects downward from a bottom surface of the base portion, and the boss is sized to nest in a corresponding mounting opening in a base of the module in which the clip is installed.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms fiber and cable are used interchangeably to refer to an optical fiber that may be buffered or jacketed, and to a fiber optic cable that contains two or more fibers. The term communication line is used broadly to refer to an optical fiber, a fiber optic cable, a wire cable, or a hybrid cable.

Figure 1:
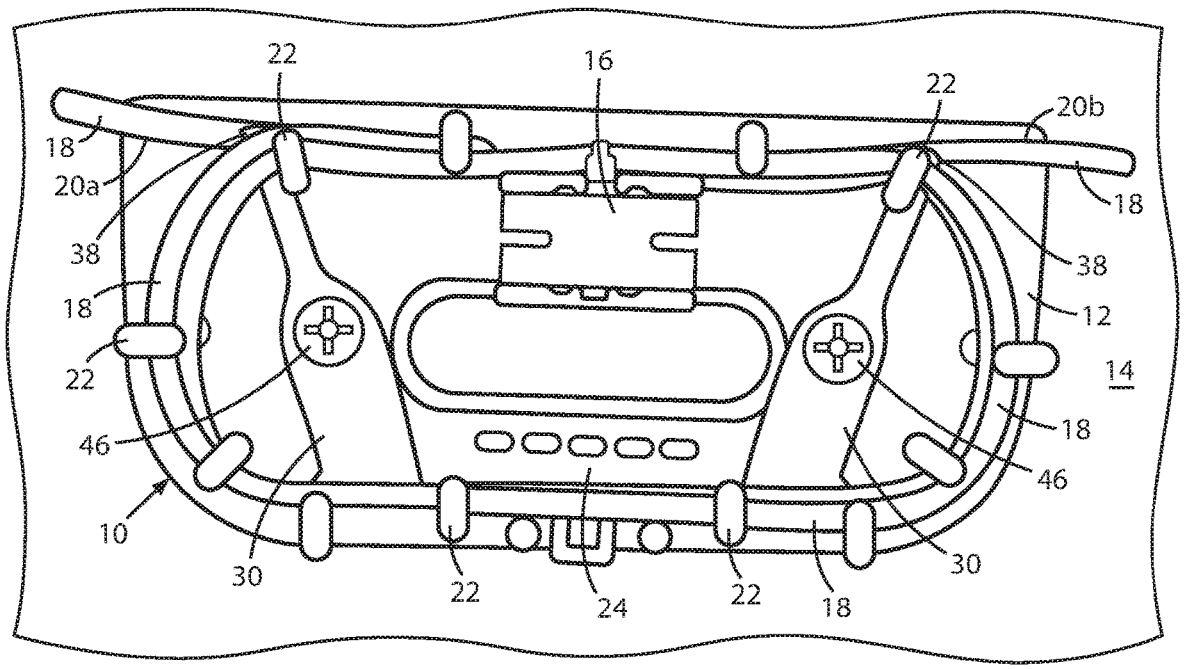
FIG. 1 is an elevation view of an uncovered point-of-entry module as mounted on a building wall, and including two fire safety retention clips according to the invention.

FIG. 1 shows an uncovered POE module 10 having a generally rectangular base 12 measuring, for example, about 5.25 by 2.5 inches. The module base 12 is mounted on a wall 14, e.g., above an entry door of a living unit along a hallway inside a MDU building. The module 10 may be similar to POE modules available from OFS Fitel, LLC; namely, OFS catalog item 301107454 which includes an SC-APC connector adapter 16, item 301107447 which includes an LC-APC connector adapter, and item 301107462 which features a splice tray. As noted, the module 10 also has an associated cover (not shown in the drawing) that snaps onto and protectively encloses the base 12 together with a slack winding of a fiber optic distribution cable 18 retained on the base. It will be understood, however, that the present invention can be used with other modules in which slack windings or lengths of communication lines are stored, including, for example, the compact POE module disclosed in the earlier mentioned U.S. Pat. No. 9,632,267.

The distribution cable 18 in FIG. 1 contains a number of fibers designated for living units along the hallway in which the module 10 is mounted. The cable 18 is routed along the hallway wall 14 and passes inside the module 10 through a first port 20a at the upper left of the base 12 as viewed in FIG. 1. A slack length of the cable 18 is wound several times about a set of retaining fingers 22 that project upward near the periphery of the base 12, and the remainder of the cable 18 passes outside the module 10 through a second port 20b at the upper right of the base 12 in FIG. 1.

When occupants of the living unit above which the module 10 is mounted want to obtain fiber optic network service, a first opening is formed in the jacket of the wound cable 18, and a fiber designated for the living unit is identified and cut. A second opening is formed in the cable jacket a certain length from the first opening, and a corresponding end length of the designated fiber is pulled out from the second opening. The designated fiber is then terminated in a first connector that mates to one side of the connector adapter 16. One end of a drop fiber for the living unit is terminated in a second connector, and the second connector mates to the opposite side of the adapter 16. The drop fiber is routed through the wall 14 and into the living unit to connect, for example, to an optical network terminal (ONT) that interfaces various electronic devices (e.g., televisions and/or a cable modem) inside the unit with the fiber optic network. Alternatively, the designated fiber can be spliced directly to the drop fiber, and the spliced ends of the fibers protectively sleeved and stored in a splice holder 24 on the module base 12.

Figure 2:
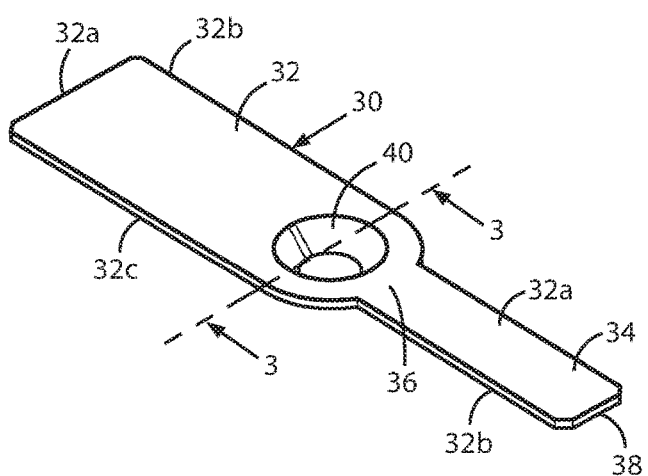
FIG. 2 is an isometric view of one of the inventive retention clips in FIG. 1 as seen from above.

Two elongated, generally rectangular retention clips 30 according to the invention are deployed on the module base 12, to retain the slack winding of the distribution cable 18 in place against the wall 14 if the module cover, the base 12, and the fingers 22 that retain the cable 18 on the base, should all melt or otherwise fail. FIG. 2 is an isometric view of one of the clips 30 as seen from above, and FIG. 3 is a cross sectional view of the clip 30 taken along line 3-3 in FIG. 2.

Each clip 30 measures, e.g., about 2.3 inches in overall length, and can be formed from a 0.025 inch (0.640 mm) thick sheet of wear resistant 1095 spring steel or equivalent. The clip 30 has a rectangular base portion 32 with a straight bottom edge 32a, and opposite parallel side edges 32b, 32c about 0.57 inch apart over a length of about 1.14 inches from the bottom edge 32a. The side edges 32b, 32c of the clip 30 then taper arcuately toward one another until the edges are about 0.27 inch apart. The edges 32b, 32c then extend parallel to one another over the remaining length of the clip 30, to define an elongated retaining finger portion 34 having a proximal end 36 and a distal end 38.

Figure 3:
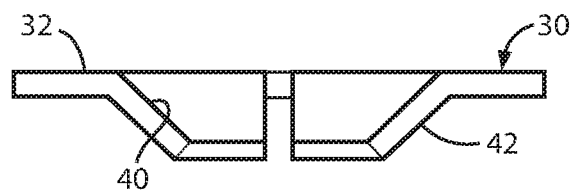
FIG. 3 is a cross sectional view of the inventive retention clip in FIG. 2 as taken along line 3-3 in FIG. 2.

As shown in FIGS. 2 and 3, each clip 30 has a screw mounting hole 40 in the base portion 32, near the proximal end 36 of the retaining finger portion 34. The hole 40 is formed so that a chamfered boss 42 protrudes downward from the flat bottom surface of the retention clip 30. The boss 42 is sized to nest within one of two corresponding chamfered mounting openings formed in the module base 12 for passage of mounting screws. In particular, the boss 42 is formed and dimensioned so that when the boss 42 nests within one of the mounting openings in the base 12, the bottom surface of the base portion 32 of the clip 30 is substantially flush with the inside flat surface of the module base 12 and without any gap that could allow the clip to wobble when installed as explained below. The diameter of the mounting hole 40 at the bottom of the boss 42 is large enough for passage of a suitable mounting screw, for example, a Phillips flat head thread forming screw for wood, drywall, or plastics.

For example, to install the two retention clips 30 in a POE module such as the module 10 in FIG. 1, the mounting screws 46 are inserted from the top of each clip 30 through the clip openings 40, and the tip of each screw 46 is placed inside a corresponding mounting opening in the base 12. The screw is firmly driven into the wall 14 so that the boss 42 on the bottom of the base portion 32 of each clip 30 nests in the mounting opening, and the bottom of the clip is flush with the module base 12. The distribution cable 18 is routed to enter the module 10 through the first port 20a at the upper left in FIG. 1, and the cable is placed underneath the finger retaining portion 34 of the clip 30 near the port 20a.

The cable 18 is then directed near the top edge of the module base 12 in FIG. 1, and placed underneath the finger retaining portion 34 of the clip 30 near the second port 20b at the upper right in FIG. 1. A determined slack length of the cable 18 is then wound about the retaining fingers 22 on the module base 12 for storage in the module 10, and the remainder of the cable is guided to pass out of the module 10 through the port 20b. Because each retention clip 30 overlies the cable 18 in the vicinity of the first and the second module ports 20a, 20b inside the module 10, the stored windings of the distribution cable 18 are retained safely in place close to the wall 14 in the event the module 10 melts or otherwise fails.

Note that because the base portions 32 of the retention clips 30 are wider than the retaining finger portions 34, the wider base portions 32 provide each clip 30 with a counterweight. Thus, if the module 10 melts and the retention clips 30 become free to rotate, the base portions 32 will keep the retaining finger portions 34 at or near an operative 12 o'clock position in FIG. 1.

Experiments were conducted to simulate a fire in a building wherein the module 10 with the inventive retention clips 30 installed, was mounted on the wall 14 inside the building. It was found that when the ambient temperature became high enough to melt the module including the module base 12 and the cable retaining fingers 22, the retention clips 30 alone held the cable windings close enough to the wall 14 so as not to pose a hazard to responders who may need to pass nearby.

Figure 4:
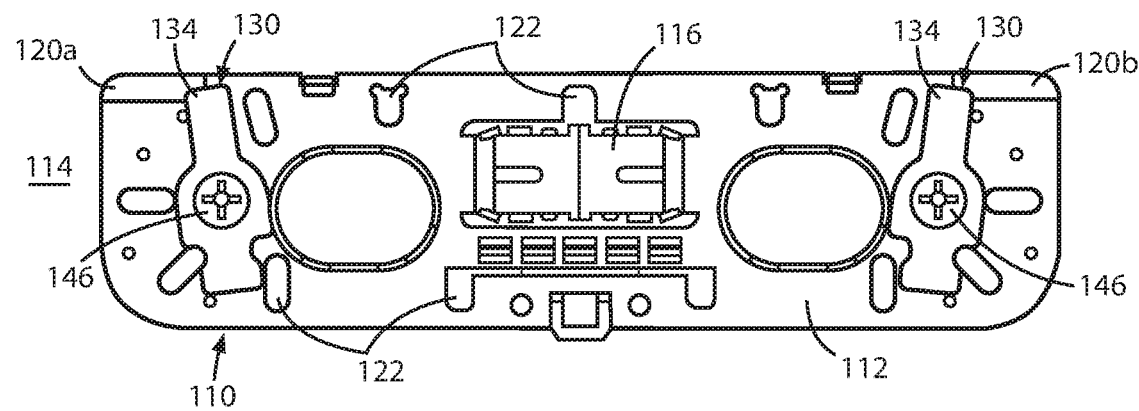
FIG. 4 is an elevation view of an uncovered POE module as mounted on a building wall, and in which two fire safety retention clips according to a second embodiment of the invention are deployed.

FIG. 4 is an elevation view of an uncovered POE module 110 as mounted on a building wall 114, and in which two fire safety retention clips 130 according to a second embodiment of the invention are deployed. The module 110 in FIG. 4 corresponds in form to the compact POE module disclosed in the above-mentioned U.S. Pat. No. 9,632,267, and is available from OFS Fitel, LLC as catalog item 301123998 with an LC-APC adapter 116, or item 301124004 with an SC-APC adapter. Windings of a fiber optic distribution cable that can be retained on a base 112 of the module 110 are omitted in FIG. 4 for purposes of clarity.

Figure 5:
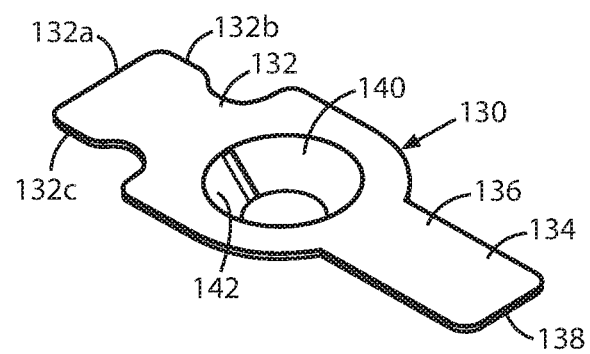
FIG. 5 is an isometric view of one of the inventive retention clips in FIG. 4 as seen from above.

FIG. 5 is an isometric view of one of the retention clips 130 as seen from above. Components of the POE module 110 that correspond to those shown in FIGS. 1 to 3 for the module 10, are identified via the same reference numerals increased by 100.

Each clip 130 measures, e.g., about 1.284 inches in overall length, and can be formed from a 0.010 inch (0.254 mm) thick sheet of wear resistant 1095 spring steel or equivalent. The clip 130 has a base portion 132, with a straight bottom edge 132a, and opposite side edges 132b, 132c extending over a length of about 0.370 inch from the bottom edge 132a. The side edges 132b, 132c of the clip 130 then taper arcuately toward one another until the edges are about 0.270 inch apart. The edges 132b, 132c then extend parallel to one another over the remaining length of the clip 130, to define an elongated retaining finger portion 134 having a proximal end 136 and a distal end 138.

Each clip 130 has a screw mounting hole 140 in the base portion 132, near the proximal end 136 of the retaining finger portion 134. The hole 140 is formed so that a chamfered boss 142 protrudes downward from the flat bottom surface of the retention clip 130. The boss 142 is sized to nest within one of two corresponding chamfered openings formed in the module base 112 for passage of mounting screws. In particular, the boss 142 is dimensioned so that the bottom surface of the base portion 132 of the clip 130 will lie flush with the inside flat surface of the module base 112, with no gap between the base portion 132 of the clip and the base 112 of the module 110 that could allow the clip to wobble when installed. The diameter of the mounting hole 140 at the bottom of the boss 142 is large enough to pass a suitable mounting screw, for example, a Phillips flat head thread forming screw for wood, drywall, or plastics.

The module base 112 is mounted on the wall 114 similarly to the base 12 of the module 10 in FIG. 1. Specifically, each one of two mounting screws 146 (see FIG. 4) is inserted from the top of a corresponding retention clip 130 to pass completely through the boss opening 140. The tip of the screw 146 is then placed inside a corresponding mounting opening in the module base 112, and driven firmly into the wall 114 so that the boss 142 on the bottom of the base portion 132 of the clip is nested in the mounting opening in the module base 112, and the bottom surface of the clip 130 is flush with the surface of the base 112. To retain slack windings of a distribution cable safely in place against the wall 114 if the module 110 melts or otherwise fails during a building fire, the retaining finger portion 134 of each retention clip 130 is positioned to overlie the cable in the vicinity of the first and the second module ports 120a, 120b inside the module 110, as detailed above with respect to the module 10.

While the foregoing represents preferred embodiments of the present invention, it will be understood by persons skilled in the art that various changes, modifications, and additions can be made without departing from the spirit and scope of the invention.

For example, POE modules smaller in size than the modules 10 and 110 may only require one retention clip, while larger units could require three, four, or more clips to capture additional fiber loops. Also, in lieu of having the base portion 32, 132 of each clip 30, 130 act as a counterweight, the clip may be formed to have a cross shape, i.e., four arms, or a circular shape so that the stored fiber will be retained in place by a part of the clip even if the clip rotates from its initial position about the mounting screws 46, 146. Accordingly, the invention includes all such changes, modifications, and additions that are within the scope of the following claims.

We claim:

1. A module for storing a length of a communication line and for holding the line in place against a wall or other building surface in the event the module melts during a fire or otherwise fails, comprising:
  a module base dimensioned and configured for mounting on the wall or other building surface, wherein the base is constructed and arranged for storing a slack winding of the communication line, and the module base is formed of a material known to soften or melt at temperatures attained during a building fire;
  at least one metallic mounting screw for mounting the module base on the wall or other building surface, wherein the mounting screw is formed to be driven firmly into the wall or other surface on which the module is mounted;
  the module base has a first port and a second port located to pass the communication line inside the module, and a set of retaining fingers about which the slack winding of the communication line can be wound;
  an elongated retention clip body formed of a metallic sheet material;
  the retention clip body has a base portion, a retaining finger portion a proximal end of which is joined to the base portion of the clip body, and a mounting hole in the base portion of the clip body for passage of a corresponding mounting screw for mounting the module base on the wall or other building surface;
  the module base has a chamfered mounting opening for receiving the mounting screw for the module base;
  a distal end of the retaining finger portion of the retention clip body is configured to overlie the communication line in the vicinity of a corresponding one of the first and the second ports when the communication line is stored inside the module, and to hold the communication line close to the wall or other building surface on which the module is mounted in the event the module melts or otherwise fails; and
  the mounting hole in the base portion of the retention clip body is formed by a chamfered boss that protrudes downward from a bottom surface of the base portion of the clip body, and the boss is sized to nest within the corresponding chamfered mounting opening in the module base for passage of the mounting screw for the module base, so that the clip body is substantially flush with the module base when tightened against the module base by the mounting screw to prevent the clip body from wobbling.

2. A module according to claim 1, wherein the retention clip body is formed of spring steel.

3. A module according to claim 1, wherein the overall width of the base portion of the retention clip body is greater than the width of the retaining finger portion.

4. A module according to claim 3, wherein the base portion of the retention clip body operates as a counterweight if the clip body becomes free to rotate about the mounting screw, so that the retaining finger portion of the clip body maintains a position at which the distal end of the finger portion overlies the communication line stored inside the module and holds the line in place against the wall or other surface on which the module is mounted if the module melts or otherwise fails.

5. A module for storing a length of a communication line and for holding the line in place against a wall or other building surface in the event the module melts during a fire or otherwise fails, comprising:
  a module base dimensioned and configured for mounting on the wall or other building surface, wherein the base is constructed and arranged for storing a slack winding of the communication line, and the module base is formed of a material known to soften or melt at temperatures attained during a building fire;
  at least one metallic mounting screw for mounting the module base on the wall or other building surface, wherein the mounting screw is formed to be driven firmly into the wall or other surface on which the module is mounted;
  the module base has a first port and a second port located to pass the communication line inside the module, and a set of retaining fingers about which the slack winding of the communication line can be wound;

a retention clip body formed of a metallic sheet material;

a part of the retention clip body is configured to overlie the communication line in the vicinity of a corresponding one of the first and second ports when the communication line is stored inside the module, and to hold the communication line in place close to the wall or other building surface on which the module is mounted in the event the module melts or otherwise fails;

the retention clip body has a mounting hole for passage of a corresponding mounting screw for mounting the module base on the wall or other building surface, wherein the mounting hole is formed by a chamfered boss that protrudes downward from a bottom surface of the retention clip body;

the module base has a chamfered mounting opening for receiving the mounting screw for the module base; and the chamfered boss that protrudes from the bottom surface of the clip body is sized to nest within the corresponding chamfered mounting opening in the module base, so that the clip body is substantially flush with the module base when tightened against the module base by the mounting screw to prevent the clip body from wobbling.

6. A module according to claim 5, wherein the retention clip body is formed of spring steel.

7. A module according to claim 5, wherein the retention clip body is formed to have a cross shape so that the communication line is retained in place by a part of the clip body against the wall or other building surface on which the module is mounted if the module melts or otherwise fails and the retention clip body rotates from an initial position.

8. A module according to claim 5, wherein the retention clip body is formed to have a circular shape so that the communication line is retained in place by a part of the clip body against the wall or other building surface on which the module is mounted if the module melts or otherwise fails and the retention clip body rotates from an initial position.

9. A module according to claim 1, wherein the mounting screw is flat headed.

10. A module according to claim 1, wherein the mounting screw is thread forming.

11. A module according to claim 5, wherein the mounting screw is flat headed.

12. A module according to claim 5, wherein the mounting screw is thread forming.

* * * * *